United States Patent [19]
Takahashi et al.

[11] Patent Number: 5,856,426
[45] Date of Patent: Jan. 5, 1999

[54] PARA-ORIENTED AROMATIC POLYAMIDE POROUS FILM

[75] Inventors: Tsutomu Takahashi; Tatsuo Tateno; Yoshifumi Tsujimoto, all of Ibaraki, Japan

[73] Assignee: Sumitomo Chemical Company, Limited, Osaka, Japan

[21] Appl. No.: 756,245

[22] Filed: Nov. 25, 1996

Related U.S. Application Data

[63] Continuation-in-part of Ser. No. 682,967, Nov. 25, 1996, abandoned.

[30] Foreign Application Priority Data

| Jul. 18, 1995 | [JP] | Japan | 7-181953 |
| Jul. 18, 1995 | [JP] | Japan | 7-181955 |
| Dec. 1, 1995 | [JP] | Japan | 7-338172 |

[51] Int. Cl.⁶ .......... C08G 73/10; C08G 69/08; B32B 27/08; B29C 39/14
[52] U.S. Cl. .......... 528/310; 528/312; 528/315; 528/322; 528/329.1; 528/332; 528/335; 528/336; 524/600; 524/606; 524/607; 428/474.5; 264/555; 264/557; 264/561; 264/562
[58] Field of Search .......... 528/312, 315, 528/310, 322, 335, 332, 329.1, 336; 524/600, 606, 607; 264/555, 557, 561, 562; 428/474.5

[56] References Cited

U.S. PATENT DOCUMENTS 5,442,003  8/1995  Takahashi et al. .......... 524/104

*Primary Examiner*—P. Hampton-Hightower
*Attorney, Agent, or Firm*—Sughrue, Mion, Zinn, Macpeak & Seas, PLLC

[57] ABSTRACT

A para-oriented polyamide porous film comprising a fibril having a diameter of not more than $1\mu$, with fibrils planarly arranged as a network or nonwoven fabric and laminated in a layer, the thermal linear expansion coefficient at 200°–300° C. within $\pm 50 \times 10^{-6}$/°C. and 30–95% vacant spaces. Also, a battery separator using the porous film. Also, a production process of: (a) forming a film-like material from a solution containing 1–10% of a para-oriented aromatic polyamide having an inherent viscosity of 1.0–2.8 dl/g and 1–10% of a chloride of an alkali metal or an alkali earth metal in a polar amide or polar urea solvent; (b) maintaining the film-like material at not less than 20° C. and not more than –5° C. to deposit the para-oriented aromatic polyamide; and (c) immersing the film-like material in an aqueous or alcoholic solution to elute the sovlent and chloride of the alkali metal or alkali earth metal, then drying to obtain the para-oriented aromatic polyamide porous film. The film has uniformity and fine vacant spaces, which cannot be accomplished by a nonwoven fabric. Characteristics of a para-aramid (e.g., high heat resistance, high rigidity, high strength, etc.) are used.

10 Claims, 4 Drawing Sheets

PARA-ORIENTED AROMATIC POLYAMIDE POROUS FILM

This is a Continuation-in-Part of application Ser. No. 08/682,967 filed Nov. 25, 1996 now abandoned.

FIELD OF THE INVENTION

The present invention relates to a porous film of a para-oriented aromatic polyamide (hereinafter referred to as a "para-aramid", sometimes), and a process for producing the same. More particularly, it relates to a porous film having a structure that fibrils of a para-aramid are planary arranged in the form of a network or a nonwoven fabric and laminated in the form of a layer, and a process for producing the same.

The para-aramid porous film of the present invention is superior in heat resistance and rigidity, and can be suitably used as a battery separator.

BACKGROUND OF THE INVENTION

A process for producing a porous film of an aromatic polyamide (hereinafter referred to as an "aramid", sometimes) is described in Japanese Patent Kokoku Nos. 59-14494 and 59-36939. In the former, there is suggested a process comprising casting a solution prepared by dissolving an aramid in a solvent in the form of a film, and solidifying the film and removing the solvent from the solidifyed film to produce a porous film. In the process, it is explained that an uniform porous film having a pore diameter of several angstrom to 100 μm can be produced because a polymer is not agglomerated and precipitated. In the latter, there is described a process of producing a porous film from a coacervation composition prepared by adding a poor solvent to an aramid solution. It is explained that an uniform porous film can be produced with causing no difference in porosity between the surface and interior of the film because the coacervation is composed of a liquid phase enriched with a colloid and a liquid phase which is lacking in the colloid.

In Japanese Patent Kokai (Laid-Open) No. 2-222430, there is described a microporous aramid film wherein micropores exist continuously on both sides of the film. It is explained that the film is superior to the above-described porous film in heat resistance and is superior in dimensional stability to humidity. In comparison with Japanese Patent Kokoku No. 59-36939, the process of the film is characterized by including a step of stretching a casted film in a longitudinal direction immediately after immersing it in water, i.e. step of stretching.

However, the porous film obtained by the process described in the above gazettes is a film in the form having penetrated pores, as is apparent from the description of Japanese Patent Kokai (Laid-Open) No. 2-222430, i.e. description that the aramid porous film has continuous micropores. Also, the porous film does not form a fibril in the form of a network or a nonwoven fabric in the present invention, as is apparent from the Comparative Examples described hereinafter.

It is explained in the above-described Japanese Patent Kokai Nos. 59-14494 and 59-36939 that the resultant porous film is useful for a battery separator. Furthermore, in Japanese Patent Kokai (Laid-Open) Nos. 53-58636 and 5-335005, there is a description about a battery separator of an aramid.

In Japanese Patent Kokai (Laid-Open) No. 53-58636, there is described that it becomes possible to reduce deterioration under high temperature, stabilize characteristics of a battery and prolong a lifetime by using a fabric or an nonwoven fabric of an aramid as a battery separator. In Japanese Patent Kokai (Laid-Open) No. 5-335005, there is described that a nonwoven fabric of an aramid fiber or a porous film, more specifically a NOMEX® paper (meta-aramid paper) manufactured by Du Pont Co. is used as a separator of a lithium secondary battery.

Under these circumstances, one objective of the present invention is to provide a para-aramid porous film having an uniformity and fine vacant spaces, which can not be accomplished by a nonwoven fabric, and a process for producing the same, by making use of characteristics of a para-aramid (e.g. high heat resistance, high rigidity, high strength, excellent solvent resistance, etc.). Another objective of the present invention is to provide a battery separator using the para-aramid porous film.

SUMMARY OF THE INVENTION

Under these circumstances, the present inventors have studied intensively. As a result, the present invention has been accomplished. That is, the present invention relates to a para-oriented aromatic polyamide porous film, the porous film of a para-oriented aromatic polyamide comprising a fibril having a diameter of not more than 1 μm and having a structure that fibrils are planary arranged in the form of a network or a nonwoven fabric and laminated in the form of a layer, wherein a thermal linear expansion coefficient at 200° to 300° C. of the film is within $\pm 50 \times 10^{-6}$/°C. and a percentage of vacant spaces is from 30 to 95%.

The present invention also relate to a process for producing a para-oriented aromatic polyamide porous film, comprising the following steps (a) to (c):

step (a) of forming a film-like material from a solution containing 1 to 10% by weight of a para-oriented aromatic polyamide having an inherent viscosity of 1.0 to 2.8 dl/g and 1 to 10% by weight of a chloride of an alkali metal or an alkali earth metal in a polar amide solvent or a polar urea solvent;

step (b) of maintaining the film-like material at the temperature of not less than 20° C. or not more than −5° C. to deposit the para-oriented aromatic polyamide; and step (c) of immersing the film-like material obtained in the step (b) in an aqueous solution or an alcoholic solution to elute the solvent and chloride of the alkali metal or alkali earth metal, followed by drying to obtain the para-oriented aromatic polyamide porous film.

The present invention also relate to a process for producing a para-oriented aromatic polyamide porous film, comprising the following steps (d) to (f):

step (d) of forming a film-like material from a solution containing 1 to 10% by weight of a para-oriented aromatic polyamide having an inherent viscosity of 1.0 to 2.8 dl/g and 1 to 10% by weight of a chloride of an alkali metal or an alkali earth metal in a polar amide solvent or a polar urea solvent;

step (e) of immersing the film-like material in a coagulating solution containing 0 to 70% by weight of a polar amide solvent or a polar urea solvent to coagulate and deposit the para-oriented aromatic polyamide; and step (f) of immersing the film-like material obtained in the step (e) in an aqueous solution or an alcoholic solution to elute the solvent and chloride of the alkali metal or alkali earth metal, followed by drying to obtain the para-oriented aromatic polyamide porous film.

The present invention further relate to a para-oriented aromatic polyamide porous film produced by the above processes. The present invention also relate to a battery separator using the para-oriented aromatic polyamide porous film.

DETAILED DESCRIPTION OF THE INVENTION

Figure 1:
FIG. 1 is a photograph illustrating a structure of the surface of the glass plate side of the porous film obtained in Example 13 (scanning electron micrograph, ×50000).

The present invention will be explained in detail, hereinafter.

In the present invention, the para-oriented aromatic polyamide substantially comprise a repeating unit wherein an amide bond is bonded at the para-position or similar orientation position (e.g. orientation position extending in the opposite direction (coaxial) or parallel, such as 4,4'-biphenylene, 1,5-naphthalene, 2,6-naphthalene, etc.) of the aromatic ring, and is a high heat-resistant polymer which has excellent mechanical characteristics such as high strength, high elastic modulus, etc. and has no melting point and glass transition point, a pyrolysis temperature of which sometimes reach 500° C. or more.

Specific examples of the para-oriented aromatic polyamide include para-aramid having a para-oriented structure or para-aramid having a structure similar to the para-oriented structure, such as poly(paraphenyleneterephthalamide), poly(parabenzamide), poly(4,4'-benzanilideterephthalamide), poly(paraphenylene-4,4'-biphenylenedicarboxylic acid amide), poly(paraphenylene-2,6-naphthalenedicarboxylic acid amide), poly(2-chloro-paraphenylene terephthalamide), a copolymer of paraphenylenediamine/2,6-dichloroparaphenylenediamine/terephthalic acid dichloride, etc., The para-oriented aromatic polyamide porous film (hereinafter referred to as a "porous film", sometimes) of the present invention is a porous film obtained from the above para-oriented aromatic polyamide, and the film is composed of a fibril of a para-aramid and has the form of a network or a nonwoven fabric, observing microscopically. That is, the para-oriented aromatic polyamide porous film of the present invention has a structure that fibrils having a diameter of not more than 1 μm are planary arranged in the form of a network or a nonwoven fabric and laminated in the form of a layer. The phrase "planary arranged" used herein means the fact that the fibrils are arranged on a parallel with the film surface.

The porous film of the present invention is composed of a fibril and has large vacant spaces. A percentage of vacant spaces is from 30 to 95%, preferably from 35 to 90%. When the percentage of vacant spaces is less than 30%, the film can not be said to be porous, substantially. On the other hand, when it exceeds 95%, the strength of the film becomes weak and, therefore, the handling becomes difficult.

Regarding the porous film of the present invention, a thermal linear expansion coefficient at 200° to 300° C. is within $\pm 50 \times 10^{-6}/°C.$, preferably $\pm 25 \times 10^{-6}/°C.$. Small thermal linear expansion coefficient shows good dimensional stability in the planar direction.

The porous film of the present invention is a film having a structure that the vacant space formed in the fibril is uniform in the thickness direction. According to the present invention, there can be provided a film wherein a size of the vacant space is comparatively small on one surface of the porous film whereas the size of the vacant space is comparatively large on the opposite surface, that is, the size of the vacant space differs in both sides. The porous film having a structure that the size of the vacant space formed in the fibril varies continuously in the thickness direction of the porous film is also included in the present invention.

The process for producing the porous film of the para-oriented aromatic polyamide used in the present invention is not specifically limited, and examples thereof include a process comprising casting an aromatic polyamide solution dissolved in an amide solution in the form of a film, solidifying the solution and extracting a solvent to obtain a porous film. Examples of the preferable process for producing the para-oriented aromatic polyamide porous film include process comprising casting a para-oriented aromatic polyamide solution in the form of a film, maintaining at the temperature of not less than 20° C. or not more than −5° C. to deposit a para-oriented aromatic polyamide, and extracting a solvent, or process of casting in the form of a film and immersing in a coagulating solution, immediately after casting, to coagulate the para-oriented aromatic polyamide, and extracting the solvent.

Specific examples of the former process include process for producing via the following steps (a) to (c):
step (a) of forming a film-like material from a solution containing 1 to 10% by weight of a para-oriented aromatic polyamide having an inherent viscosity of 1.0 to 2.8 dl/g and 1 to 10% by weight of a chloride of an alkali metal or an alkali earth metal in a polar amide solvent or a polar urea solvent;
step (b) of maintaining the film-like material at the temperature of not less than 20° C. or not more than −5° C. to deposit the para-oriented aromatic polyamide; and
step (c) of immersing the film-like material obtained in the step (b) in an aqueous solution or an alcoholic solution to elute the solvent and chloride of the alkali metal or alkali earth metal, followed by drying to obtain the para-oriented aromatic polyamide porous film The respective steps will be explained in detail.

The para-aramid solution used in the step (a) can be suitably produced by the operation described below. That is, the para-aramid solution wherein a para-aramid concentration is from 1 to 10% by weight is prepared by adding 0.94 to 0.99 mol of a para-oriented aromatic dicarboxylic acid dihalide per 1.0 mol of a para-oriented aromatic diamine in a polar amide solvent or a polar urea solvent wherein 1 to 10% by weight of a chloride of an alkali metal or an alkali earth metal is dissolved, followed by condensation polymerization at the temperature of −20° to 50° C.

An amount of the chloride of the alkali metal or alkali earth metal in the para-aramid solution is from 1 to 10% by weight, preferably from 2 to 8% by weight. Normally, when the amount of the chloride of the alkali metal or alkali earth metal is less than 1%, the solubility of the para-aramid is insufficient. On the other hand, when it exceeds 10% by weight, the chloride of the alkali metal or alkali earth metal does not dissolve in the polar amide solvent or polar urea solvent. More precisely, the amount of the chloride of the chloride of the alkali metal or alkali earth metal in the para-aramid solution is decided based on an amount of the para-aramid (amide group in the para-aramid). That is, the amount of the above chloride added to the polymerization system is preferably from 0.5 to 6.0 mol, more preferably from 1.0 to 4.0 mol, per 1.0 mol of the amide group formed by condensation polymerization. When the amount of the chloride is less than 0.5 mol, the solubility of the formed para-aramid becomes insufficient. On the other hand, when it exceeds 6.0 mol, it substantially exceed an amount of the chloride which can dissolve in the solvent, and it is not preferred.

A para-aramid concentration in the para-aramid solution is from 1 to 10% by weight, preferably from 2 to 8% by weight. When the para-aramid concentration is less than 1% by weight, the productivity is drastically lowered, thereby causing an industrial disadvantage. On the other hand, when the para-aramid concentration exceeds 10% by weight, a stable para-aramid solution can not be obtained because the para-aramid deposits.

The para-aramid in the step (a) is a para-aramid which shows a value of an inherent viscosity (inherent viscosity in the present invention is as defined below) within the range from 1.0 to 2.8 dl/g, preferably from 1.5 to 2.6. When the inherent viscosity is less than 1.0 dl/g, a sufficient film strength can not be obtained. On the other hand, when the inherent viscosity exceeds 2.8 dl/g, a stable para-aramid solution is not easily obtained and, therefore, it becomes difficult to form a film because of the para-aramid deposits.

Examples of the para-oriented aromatic diamine used for condensation polymerization of the para-aramid in the step (a) include paraphenylenediamine, 4,4'-diaminobiphenyl, 2-methyl-paraphenylenediamine, 2-chloro-paraphenylenediamine, 2,6-dichloro-paraphenylenediamine, 2,6-naphthalenediamine, 1,5-naphthalenediamine, 4,4'-diaminobenzanilide, 3,4'-diaminodiphenyl ether, etc. One or two sorts of the para-oriented aromatic diamines can be applied for condensation polymerization.

Examples of the para-oriented aromatic dicarboxylic acid dihalide used for condensation polymerization of the para-aramid in the step (a) include terephthalic acid dichloride, biphenyl-4,4'-dicarboxylic acid chloride, 2-chloroterephthalic acid dichloride, 2,5-dichloroterephthalic acid chloride, 2-methylterephthalic acid dichloride, 2,6-naphthalenedicarboxylic acid dichloride, 1,5-naphthalenedicarboxylic acid chloride, etc. One or two sorts of the para-oriented aromatic dicarboxylic acid dihalides can be applied for condensation polymerization.

The polycondensation polymerization of the para-aramid in the step (a) is conducted in the polar amide solvent or polar urea solvent. Examples of the solvent include N,N-dimethylformamide, N,N-dimethylacetamide, N-methyl-2-pyrrolidone, N,N,N',N'-tetramethylurea, etc. Among them, N-methyl-2-pyrrolidone is particularly preferred, but the solvent is not limited thereto.

In the step (a), the chloride of the alkali metal or alkali earth metal is suitably used for the purpose of improving the solubility of the para-aramid in the solvent. Specific examples thereof include lithium chloride and calcium chloride, but the metal is not limited thereto.

In the step (a), a film-like material can be produced while maintaining a shape as the film-like material by casting a para-aramid solution on a substrate such as glass plate, polyester film, etc. As the casting process, there can be appropriately used various processes such as process of extruding on a substrate from a bar coater or a T-die.

In the step (b), a para-aramid is deposited after forming in the form of a film from a para-aramid solution in the step (a) before coagulating.

The process of the present invention has an excellent feature in that a porous film is produced by forming a film-like material from a para-aramid solution, and depositing a para-aramid before coagulating. According to this process, the finally obtained porous film can have an uniform structure in the thickness direction. In the process, the film is maintained at the temperature of not less than 20° C. or not more than −5° C. for a given time (hereinafter referred to as a "high-temperature deposition process" or a "low-temperature deposition process", respectively). The form factor of the finally obtained porous film (e.g. vacant space, diameter of fibril, etc.) can also be controlled by the deposition temperature and maintenance time.

Firstly, the high-temperature deposition process will be explained. In order to produce a porous film by the high-temperature deposition process, a para-aramid solution is maintained at the temperature of not less than 20° C., preferably not less than 30° C., for a given time to deposit a para-aramid.

The time at which the para-aramid begins to deposit depends on the composition of the para-aramid solution (e.g. amount of chloride, para-aramid concentration, etc.) and temperature maintained and, therefore, it is not specifically limited.

For example, when the para-aramid concentration is 6% by weight and an amount of calcium chloride is the same mol as that of the amide group, the para-aramid solution is stable at 20° C. for one week or more and causes no deposition but the para-aramid deposits at 60° C. in about 5 minutes. When the para-aramid concentration is 6% by weight and the amount of calcium chloride is 0.7 mol per one mol of the amide group, the para-aramid deposits at 20° C. after about half a day and deposits at 30° C. after about one hour. It is preferred to control the humidity at higher level, in addition to the deposition temperature, so as to enhance the deposition. In this case, it is particularly preferred to adjust the humidity (relative humidity) to 40 to 100%.

As described above, the higher the temperature, the shorter the time at which the para-aramid begins to deposit may be. Since the form factor (e.g. vacant space of porous film, diameter of fibril, etc.) depends on the deposition temperature, the deposition temperature is decided by a synthetic judgment according to the purpose.

Next, the low-temperature deposition process will be explained. In order to produce a porous film by the low-temperature deposition process, a para-aramid solution is maintained at the temperature of not more than −5° C., preferably not more than −10° C., for a given time to deposit a para-aramid, thereby obtaining a film.

The time at which the para-aramid begins to deposit depends on the composition of the para-aramid solution (e.g. amount of chloride, para-aramid concentration, etc.) and temperature maintained and, therefore, it is not specifically limited.

For example, when the para-aramid concentration is 6% by weight and an amount of calcium chloride is the same mol as that of the amide group, the para-aramid solution is stable at −5° C. for one week or more and causes no deposition but the para-aramid deposits at −20° C. in about 30 minutes. When the para-aramid concentration is 6% by weight and the amount of calcium chloride is 0.7 mol per one mol of the amide group, the para-aramid deposits at −5° C. after about half a day and deposits at −10° C. after about one hour.

As described above, the lower the temperature, the shorter the time at which the para-aramid begins to deposit may be. Since the form factor (e.g. vacant space of porous film, diameter of fibril, etc.) depends on the deposition temperature, the deposition temperature is decided by a synthetic judgment according to the purpose.

In the step (c), the solvent and chloride of the alkali metal or alkali earth metal are removed from the film-like material obtained in the step (b). As the removal process, for example, there is a process of immersing the film-like material in a solution to elute the solvent and chloride. When the solvent is removed from the film-like material by evaporation, there can also used a process of immersing again in a solution such as water to elute the chloride. As the solution used for eluting the solvent or chloride, an aqueous solution or an alcoholic solution is preferred because the solvent and chloride can be dissolved. As the aqueous solution, water may be used.

The film-like material wherein the solvent and chloride have been removed is dried to produce the objective porous film. The drying process is not specifically limited, and known various processes can be used. The term "film-like material" used herein means an intermediate form before it becomes the porous film as the final product.

Another preferred example of the process for producing the para-oriented aromatic polyamide porous film of the present invention is a process of extruding a para-oriented aromatic polyamide solution in the form of a film, immediately immersing in a coagulating solution to coagulate a para-oriented aromatic polyamide, and eluting a solvent (hereinafter referred to as a "coagulating solution immersing process", sometimes). Specifically, it is a process for producing the porous film via the following steps (d) to (f):

step (d) of forming a film-like material from a solution containing 1 to 10% by weight of a para-oriented aromatic polyamide having an inherent viscosity of 1.0 to 2.8 dl/g and 1 to 10% by weight of a chloride of an alkali metal or an alkali earth metal in a polar amide solvent or a polar urea solvent;

step (e) of immersing the film-like material in a coagulating-solution containing 0 to 70% by weight of a polar amide solvent or a polar urea solvent to coagulate and deposit the para-oriented aromatic polyamide; and step (f) of immersing the film-like material obtained in the step (e) in an aqueous solution or an alcoholic solution to elute the solvent and chloride of the alkali metal or alkali earth metal, followed by drying to obtain the para-oriented aromatic polyamide porous film.

The coagulating solution used in the step (e) is a solvent which does not dissolve the para-aramid and is compatible with a polar amide solvent or a polar urea solvent. Preferably, it is a solvent which can dissolve the chloride of the alkali metal or alkali earth metal. Specific examples thereof include water and alcohols such as methanol, etc. The kind of the polar amide solvent or polar urea solvent in the aqueous solution or alcoholic solution is not specifically limited, but it is preferred to use a solvent used for the para-aramid solution because a solvent recovering step is simplified industrially. The form factor such as a percentage of vacant spaces of the finally obtained porous film, diameter of the fibril, etc. can also be controlled by the kind of the coagulating solution used and concentration of the polar amide solvent or polar urea solvent in the coagulating solution.

As the coagulating solution used in this step, a coagulting solution containing 1 to 70% of the polar amide solvent or polar urea solvent is used, more preferably. When the concentration of the polar amide solvent or polar urea solvent in the coagulating solution is less than 1%, it is industrially disadvantageous because of too large load in the solvent recovering step. The high concentration is not specifically limited, however, when the concentration exceeds 70%, it takes a long time for coagulation and it becomes difficult to maintain the form of the film-like material until the para-aramid deposits.

The process of the present invention has an excellent feature in that a porous film is produced by a simple go process comprising extruding a para-aramid solution to form a film-like material on a substrate, immersing the film-like material in a coagulating solution containing 0 to 70% by weight of a polar amide solvent or a polar urea solvent to coagulate a para-aramid, followed by depositing. This process differs from the above low-temperature and high-temperature processes in that the para-aramid is coagulated and deposited, simultaneously, from the film-like material of the para-aramid in the coagulating solution.

A film thickness of the resultant porous film is not specifically limited, but the film thickness at the time of applying on the substrate is preferably less than 1 mm. When the film thickness at the time of applying becomes not less than 1 mm, a surface of the film is coagulated. However, the non-coagulated part of the interior is liable to flow and, therefore, it is difficult to obtain an uniform porous film. In this case, it is necessary that a dam is provided to prevent the non-coagulated part from flowing.

When the coagulating solution is an aqueous solution, the film strength is liable to become higher as the temperature at the time of coagulating becomes higher. Within the range of room temperature to 60° C., there is not a large difference in structure of the vacant space and form of the fibril. Accordingly, the temperature is not specifically limited, but it is industrially economical to coagulate at about room temperature.

According to the process of the present invention, there can be obtained a porous film having a structure that a size of a vacant space varies in the thickness direction of the film, that is, the size of the vacant space formed in the fibril is comparatively small on one surface of the porous film whereas the size of the vacant space is comparatively large on the opposite surface. It is also possible to produce a porous film having a structure that the size of the vacant space formed in the fibril varies continuously in the thickness direction of the porous film.

That is, when the film-like material of the para-aramid solution is formed on the substrate and then immersed in the coagulating solution as the aqueous solution, a vacant space of about 0.005 to 0.030 μm can be observed at the side which directly come into contact with the coagulating solution on the surface of the film-like material, using a scanning electron microscope. On the other hand, the substrate side shows a form of a nonwoven fabric of a fibril having a vacant space of 0.005 to 0.10 μm and the size of the fibril becomes about 0.005 to 0.1 μm.

A gradient structure with respect to the above vacant space, i.e. difference (ununiformity) in vacant space and form with the thickness direction of the resultant film is liable to become smaller as the concentration of water in the coagulating solution becomes lower. It is possible to increase the ununiformity by increasing the concentration of water in the coagulating solution.

When using an acetone solution in place of the aqueous solution as the coagulating solution, the diameter of the fibril and size of the vacant space become large. Similar to the case of the aqueous solution, the ununiformity of the porous film in the thickness direction is recognized. A size of the vacant space is not specifically limited, but is about from 0.005 to 2 μm at the coagulating solution side and is about from 0.005 to 20 μm at the substrate side. Therefore, the size of the pore is smaller at the coagulating solution side.

The ununiformity of the porous film in the thickness direction is sometimes advantageous according to the use of the porous film and, therefore, it is technically advantageous to be able to control the ununiformity.

The steps (d) and (a), and the steps (f) and (c) are the same steps, respectively, and the same operation is conducted.

The porous film of the para-oriented aromatic polyamide obtained by the process of the present invention has a structure that fibrils of a para-oriented aromatic polyamide having a diameter of not more than 1 μm are planarly arranged in the form of a network or a nonwoven fabric and are laminated in the form of a layer. As described above, according to the present invention, there is provided a process which can easily control the diameter of the fibril, size of the vacant space formed from the fibril, percentage of vacant spaces, etc.

As explained above, the porous film of the present invention has a structure that fibrils of the para-aramid are planary arranged in the form of a network or a nonwoven fabric and laminated in the form of a layer. Since the fibrils are planary arranged, the porous film has various excellent physical properties. Firstly, the porous film has a rigidity, a heat resistance and a mechanical strength, which are original properties of the para-aramid. Secondary, the porous film has a dimensional stability in the planar direction, that is, a thermal linear expansion coefficient at 200° to 300° C. is within $\pm 50 \times 10^{-6}$/°C. Furthermore, the mechanical strength is maintained to some extent even if the percentage of vacant spaces is high.

The porous film of the present invention can be used for a battery separator, an electrical insulating paper, etc. by making use of the above excellent properties. Particularly, the film of the present invention can be suitably used for a secondary battery separator because it has electrical insulating properties and is chemically stable to an electrolyte solution, and is also superior in retention of the electrolyte solution due to a fibril structure and vacant spaces formed from the fibril structure and ion penetration properties.

EXAMPLES

The following Examples further illustrate the present invention in detail but are not to be construed to limit the scope thereof. The test and evaluation methods as well as criteria in the Examples and Comparative Examples are as shown below.

(1) Inherent viscosity

In the present invention, it is defined that an inherent viscosity is measured by the following measuring method. A flow time of a solution prepared by dissolving 0.5 g of a para-aramid polymer in 100 ml of 96–98% sulfuric a acid and 96–98% sulfuric acid were measured, respectively, using a capillary viscometer at 30° C. Then, the inherent viscosity was determined from a ratio of the resultant flow times according to the following equation:

$$\text{Inherent viscosity} = \ln (T/T_0)/C \text{ [unit:dl/g]}$$

wherein T and $T_0$ respectively indicate a flow time of a para-aramid solution and that of sulfuric acid, and C is a para-aramid concentration (dl/g) in a para-aramid-sulfuric acid solution.

(2) Tensile test

A test specimen was punched from the resultant film using a dumbbell cutter manufactured by Dumbbell Co., and then a tensile strength was determined using an Instron type universal tensile tester (model 4301, manufactured by Instron Japan Co.) according to JIS K-7127.

(3) Percentage of vacant spaces

A film was cut into pieces of a square shape (length of side: L cm), and then a weight (W g) and a thickness (D cm) were measured. Assuming that a true specific gravity of the para-aramid is 1.45 g/cm³, a percentage of vacant spaces (volume %) was determined by the following equation:

$$\text{Percentage of vacant spaces} = 100 - 100 \times (W/1.45)/(L^2 \times D)$$

(4) Thermal linear expansion coefficient

A specimen was heat-treated at 250° C. for 10 minutes. The thermal analysis of this specimen was conducted using a thermal analyzing device TMA 120 manufactured by Seiko Denshi Co., Ltd. according to ASTM-D696, and a thermal linear expansion coefficient was calculated by the following equation:

$$\alpha 1 = {}_\alpha L / L_{0\alpha} T$$

wherein $\alpha 1$ is a thermal linear expansion coefficient, $_A L$ is a changed length of a specimen, $L_0$ is a length of a specimen before testing and $_A T$ is a difference in temperature ($T_2 - T_1$:°C.)($T_2 = 300$° C., $T_1 = 200$° C.)

Example 1

1. Polymerization of poly(paraphenyleneterephthalamide)

Using a 5 liter separable flask equipped with a stirring blade, a thermometer and a powder adding inlet, poly(paraphenyleneterephthalamide) (hereinafter referred to as "PPTA") was prepared. After the flask was sufficiently dried, 4200 g of N-methyl-2-pyrrolidone (hereinafter referred to as "NMP") was charged and 272.2 g of calcium dried at 200° C. for 2 hours was added, followed by heating to 100° C. After calcium chloride was completely dissolved, the temperature was returned to room temperature. Then, 132.9 g of paraphenylenediamine (hereinafter referred to as "PPD") was added and completely dissolved. While maintaining the resultant solution at 20° C.±2° C., 243.3 g of terephthaloyl dichloide (hereinafter referred to as "TPC") was added every 5 minutes in ten portions. The solution was aged for one hour while maintaining at 20° C.±2° C., and then stirred under reduced pressure for 30 minutes to remove bubbles. The resultant polymer solution (polymer dope) showed an optical anisotropy. Aliquot of the polymer solution was taken and reprecipitated in water to give a polymer. The inherent viscosity of the resultant PPTA was measured and, as a result, it was 1.97 d/g.

2. Preparation of PPTA solution

A polymer solution (100 g) of the above item 1 was weighed and charged in a separable flask equipped with a stirring blade, a thermometer, a nitrogen introducing tube and a liquid adding inlet. Then, a NMP solution wherein 5.8% by weight of calcium chloride is dissolved was gradually added. Finally, a PPTA solution having a PPTA concentration of 2.8% by weight was prepared and this solution was taken as an A solution.

3. Preparation of porous film (low-temperature deposition process)

Immediately after an A solution was applied on a glass plate to form a film-like material using a bar coater (film thickness: 0.60 mm) manufactured by Tester Sangyo Co., Ltd., the film-like material was maintained in a refrigerator at −20° C. for about one hour. As a result, PPTA deposited to form a cloudy film-like material. In this case, dropwise condensation of water was not observed on the surface of the film-like material.

This film-like material was immersed in deionized water. Several minutes after immersing, the film-like material was separated from the glass plate. This film-like material was immersed for about one hour while flowing deionized water, and then placed on a circular filter paper having a diameter of 11 cm. The film-like material was transferred to a dry filter paper and fixed to a circular frame while sandwiching between filter papers, followed by drying at 120° C. for 2 hours.

The film obtained after drying had a thickness of 84.2 $\mu$m and a porosity of 84%. The film was observed by a scanning electron microscope. As a result, it has been found that the resultant porous film comprises a fibril-like PPTA fiber having a diameter of about 0.1 to 0.3 $\mu$m and the diameter of the vacant space is not more than about 1 $\mu$m.

4. Application for battery separator

A paste (NMP solvent) prepared by mixing lithium nickelate powder, carbonaceous conductive material powder and polyvinylidene fluoride in a weight ratio of 87:10:3 was applied on an aluminum foil having a thickness of 20 $\mu$m, followed by drying and further pressing to obtain a sheet (packing density: 3.0 g/cc) having a thickness of 92 $\mu$m was used as a cathode. A paste (NMP solvent) prepared by mixing graphite powder and polyvinylidene fluoride in a weight ratio of 90:10 was applied on a copper foil having a thickness of 10 $\mu$m, followed by drying and further pressing to obtain a sheet having a thickness of 110 $\mu$m was used as an anode. An electrolyte solution was prepared by dissolving lithium phosphate hexafluoride (1 mol/liter concentration) in a mixed solvent of ethylene carbonate, dimethyl carbonate and ethylmethyl carbonate.

The porous film produced in the above item 3 was used as a separator. A battery having a flat-plate type structure (area of positive electrode: 2.34 cm$^2$) was produced by laminating the resultant negative electrode sheet, separator and positive electrode sheet in this order in a box under an argon atmosphere and sufficiently impregnating with an electrolyte solution. Regarding the resultant battery, eight cycles (charge voltage: 4.2 V, discharge voltage: 2.75 V) were repeated. As a result, the discharge capacity of the fifth cycle was 6.6 mA (discharge current: 1.5 mA) and the battery was normally operated without causing cycle deterioration.

Example 2

According to the same manner as that described in Example 1, PPTA was produced on an experimental basis. The inherent viscosity of the resultant PPTA was 2.07 dl/g. This PPTA polymer solution was diluted with a NMP solution prepared by dissolving calcium chloride to give a B solution. Regarding the B solution, the PPTA concentration was 2.0% by weight and the amount of calcium chloride was 3 mol per one mol of the amide group of PPTA.

The B solution was applied on a glass plate to form a film-like material and a film was produced according to the same manner as that described in Example 1. In this case, dropwise condensation of water was observed on the surface of the film-like material when the film-like material was taken from a refrigerator. The thickness, percentage of vacant spaces and tensile strength of the film were 9.2 $\mu$m, 50% and 4.7 kg/mm$^2$, respectively.

Example 3

The PPTA solution obtained in Example 2 was diluted with NMP to give a C solution. Regarding the C solution, the PPTA concentration was 2.0% by weight and the amount of calcium chloride was 2 mol per one mol of the amide group of PPTA.

The C solution was applied on a glass plate to form a film-like material (film thickness: 0.60 mm) and a film was produced according to the same manner as that described in Example 1. In this case, dropwise condensation of water was also observed on the surface of the film-like material when the film-like material was taken from a refrigerator. The thickness, percentage of vacant spaces and tensile strength of the film were 15.6 $\mu$m, 43% and 10.9 kg/mm$^2$, respectively.

As is apparent from the above Examples, the porosity can be controlled by the cooling temperature, humidity, etc.

Example 4

1. Preparation of porous film (high-temperature deposition process)

Immediately after an A solution was applied on a glass plate to form a film-like material using a bar coater (film thickness: 0.60 mm) manufactured by Tester Sangyo Co., Ltd., the film-like material was maintained in an heating oven at 60° C. for about 20 minutes.

This film-like material was immersed in deionized water. Several minutes after immersing, the film-like material was separated from the glass plate. This film-like material was immersed for about one hour while flowing deionized water, and then placed on a circular filter paper having a diameter of 11 cm. The film-like material was transferred to a dry filter paper and fixed to a circular frame while sandwiching between filter papers, followed by drying at 120° C. for 2 hours.

The film obtained after drying had a thickness of 11.4 $\mu$m and a percentage of vacant spaces of 45%. The film was observed by a scanning electron microscope. As a result, it has been found that the resultant porous film is a porous film comprising a fibril-like PPTA fiber having a diameter of about 0.1 $\mu$m, which has many vacant spaces. A diameter of the vacant space was not more than about 1 $\mu$m. A value of a thermal linear expansion coefficient measured between 200° and 300° C. was $-6.3 \times 10^{-6}$/°C.

4. Application for battery separator

A paste (NMP solvent) prepared by mixing lithium nickelate powder, carbonaceous conductive material powder and polyvinylidene fluoride in a weight ratio of 87:10:3 was applied on an aluminum foil having a thickness of 20 $\mu$m, followed by drying and further pressing to obtain a sheet (packing density: 3.0 g/cc) having a thickness of 92 $\mu$m was used as a cathode. A paste (NMP solvent) prepared by mixing graphite powder and polyvinylidene fluoride in a weight ratio of 90:10 was applied on a copper foil having a thickness of 10 μm, followed by drying and further pressing to obtain a sheet having a thickness of 110 μm was used as an anode. An electrolyte solution was prepared by dissolving lithium phosphate hexafluoride (1 mol/liter concentration) in a mixed solvent of ethylene carbonate, dimethyl carbonate and ethylmethyl carbonate.

The porous film produced in the above item 3 was used as a separator. A battery having a flat-plate type structure (area of positive electrode: 2.34 cm$^2$) was produced by laminating the resultant negative electrode sheet, separator and positive electrode sheet in this order in a box under an argon atmosphere and sufficiently impregnating with an electrolyte solution. Regarding the resultant battery, eight cycles (charge voltage: 4.2 V, discharge voltage: 2.75 V) were repeated. As a result, the discharge capacity of the eighth cycle was 7.3 mA (discharge current: 1.5 mA) and the battery operated normally without causing cycle deterioration.

Examples 5 to 7

According to the same manner as that described in Example 4, PPTA was produced on an experimental basis. The inherent viscosity of the resultant PPTA was 2.07 dl/g. This PPTA polymer solution was diluted with a NMP solution prepared by dissolving calcium chloride to give a solution of the composition of Table 1. Immediately after the solution was applied on the glass plate to form a film-like material, the film-like material was maintained in a heating oven at 40° C. for about 20 minutes. As a result, PPTA deposited to form a cloudy film-like material. According to the same manner as that described in Example 4, the film-like material was immersed in deionized water and dried. The thickness, percentage of vacant spaces and tensile strength of the resultant film were measured, respectively. The results are also shown in Table 1.

TABLE 1

|  | Example 5 | Example 6 | Example 7 |
|---|---|---|---|
| CaCl$_2$/amide group (mol/mol) | 4.0 | 3.0 | 2.0 |
| Polymer concentration (% by weight) | 2.0 | 2.0 | 2.0 |
| Film thickness of bar coater (mm) | 0.35 | 0.35 | 0.35 |
| Film thickness (μm) | 9.3 | 9.2 | 8.6 |
| Percentage of vacant spaces (%) | 38 | 47 | 51 |
| Tensile strength (kg/mm$^2$) | 12.8 | 9.2 | 10.6 |
| Thermal linear expansion coefficient (/°C.) | $-4.7 \times 10^{-6}$ | $-5.4 \times 10^{-6}$ | $-5.9 \times 10^{-6}$ |

Example 8

1. Polymerization of poly(paraphenyleneterephthalamide)

Using a 5 liter separable flask equipped with a stirring blade, a thermometer, a nitrogen introducing tube and a powder adding inlet, PPTA was prepared. After the flask was sufficiently dried, 4200 g of NMP was charged and 272.2 g of calcium dried at 200 for 2 hours was added, followed by heating to 100° C. After calcium chloride was completely dissolved, the temperature was returned to room temperature. Then, 132.9 g of PPD was added and completely disolved. While maintaining the resultant solution at 20° C.±2° C., 243.3 g of TPC was added every 5 minutes in ten portions. The solution was aged for one hour while maintaining at 20° C.±2° C., and then stirred under reduced pressure for 30 minutes to remove bubbles. The resultant polymer solution (polymer dope) showed an optical anisotropy. Aliquot of the polymer solution was taken and reprecipitated in water to give a polymer. The inherent viscosity of the resultant PPTA was measured and, as a result, it was 1.98 d/g.

2. Preparation of PPTA solution

A polymer solution (100 g) of the above item 1 was weighed and charged in a separable flask equipped with a stirring blade, a thermometer, a nitrogen introducing tube and a liquid adding inlet. Then, a NMP solution prepared by dissolving calcium chloride was gradually added. Finally, a PPTA solution wherein a PPTA concentration is 2.0% by weight and an amount of calcium chloride is 4-fold mole per amide group of PPTA (value calculated from the amount of PPD charged at the time of polymerizing) was prepared and this solution was taken as a D solution.

3. Preparation of porous film (coagulating solution immersing process)

A D solution was applied on a glass plate to form a film-like material using a bar coater (film thickness: 0.35 mm) manufactured by Tester Sangyo Co., Ltd., and then the glass plate was immersed in deionized water containing 10% NMP. Several minutes after immersing, the film-like material was separated from the glass plate. This film-like material was immersed for about one hour while flowing deionized water. The film-like material was taken from deionized water and, after wiping up liberated water, the film-like material was sandwiched between filter papers and then sandwiched between glass cloths. The film-like material was placed on an aluminum plate in a state of being sandwiched between filter papers and glass cloths, and coated with a nylon film. Then, the nylon film and aluminum plate were sealed with a gum and a vacuum conduit was attached thereto. The whole was put in a heating oven and the film-like material was dried at 120° C. while evacuating. The resultant film had a thickness of 15.1 μm, a percentage of vacant spaces of 62.3% and a strength of 6.3 kg/mm$^2$. The film was observed by a scanning electron microscope. As a result, it has been found that the resultant porous film consisted of PPTA fibrils of 0.02 to 0.05 μm diameter and had many vacant spaces at the glass plate side. The opposite side showed the form having a vacant space of 0.01 to 0.03 μm. A thermal linear expansion coefficient was $-7.3 \times 10^{-6}$/°C.

4. Application for battery separator

A paste (NMP solvent) prepared by mixing lithium nickelate powder, carbonaceous conductive material powder and polyvinylidene fluoride in a weight ratio of 87:10:3 was applied on an aluminum foil having a thickness of 20 μm, followed by drying and further pressing to obtain a sheet (packing density: 3.0 g/cc) having a thickness of 92 μm was used as a cathode. A paste (NMP solvent) prepared by mixing graphite powder and polyvinylidene fluoride in a weight ratio of 90:10 was applied on a copper foil having a thickness of 10 μm, followed by drying and further pressing to obtain a sheet having a thickness of 110 μm was used as an anode. An electrolyte solution was prepared by dissolving lithium phosphate hexafluoride (1 mol/liter concentration) in a mixed solvent of ethylene carbonate, dimethyl carbonate and ethylmethyl carbonate.

The porous film produced in the above item 3 was used as a separator. A battery having a flat-plate type structure (area of positive electrode: 2.34 cm$^2$) was produced by laminating the resultant negative electrode sheet, separator and positive electrode sheet in this order in a box under an argon atmosphere and sufficiently impregnating with an electrolyte solution. Regarding the resultant battery, six cycles (charge voltage: 4.2 V, discharge voltage: 2.75 V) were repeated. As a result, the discharge capacity of the sixth cycle was 6.7 mA (discharge current: 1.5 mA) and the battery caused little cycle deterioration and operated normally.

Examples 9 to 12

According to the same manner as that described in Example 8, a PPTA solution was prepared. The PPTA polymer solution of Example 8 was diluted with a NMP solution prepared by dissolving NMP or calcium chloride to give a solution of the composition of Table 2. The solution was applied on the glass plate to form a film-like material, and a porous film was produced on an experimental basis according to the same manner as that described in Example 8. The physical properties of this film are also shown in Table 2.

TABLE 2

|  | Example 9 | Example 10 | Example 11 | Example 12 |
| --- | --- | --- | --- | --- |
| $CaCl_2$/amide group(mol/mol) | 2.0 | 2.0 | 4.0 | 4.0 |
| Polymer concentration (% by weight) | 2.0 | 2.0 | 2.0 | 2.0 |
| NMP concentration of coagulating solution (% by weight) | 10 | 30 | 30 | 50 |
| Film thickness ($\mu$m) | 14.7 | 11.9 | 12.7 | 13.6 |
| Percentage of vacant spaces (%) | 66 | 63 | 61 | 64 |
| Tensile strength (kg/mm$^2$) | 5.5 | 5.6 | 7.0 | 6.2 |

Example 13

1. Polymerization of poly (paraphenyleneterephthalamide)

Using a 500 ml separable flask equipped with a stirring blade, a thermometer, a nitrogen introducing tube and a powder adding inlet, PPTA was polymerized. After the flask was sufficiently dried, 420 g of NMP was charged and 28 g of calcium dried at 200° C. for 2 hours was added, followed by heating to 100° C. After calcium chloride was completely dissolved, the temperature was returned to room temperature. Then, 12.8 g of PPD was added and completely dissolved. While maintaining the resultant solution at 20° C.±2° C., 23.3 g of TPC was added every 5 minutes in ten portions. The solution was aged for one hour while maintaining at 20° C.±2° C., and then stirred under reduced pressure for 30 minutes to remove bubbles. The resultant polymer solution (polymer dope) showed an optical anisotropy. Aliquot of the polymer solution was taken and reprecipitated in water to give a polymer. The inherent viscosity of the resultant PPTA was measured and, as a result, it was 1.83 d/g.

2. Preparation of PPTA solution

A polymer solution (100 g) of the above item 1 was weighed and charged in a 500 ml separable flask equipped with a stirring blade, a thermometer, a nitrogen introducing tube and a liquid adding inlet, and then NMP was gradually added. Finally, a PPTA solution wherein a PPTA concentration is 2.0% by weight and an amount of calcium chloride is 2-fold mole per amide group of PPTA (value calculated from the amount of PPD charged at the time of polymerizing) was prepared and this solution was taken as an E solution.

3. Preparation of porous film

Figure 2:
FIG. 2 is a photograph illustrating a structure of the surface of the coagulating solution side of the porous film obtained in Example 13 (scanning electron micrograph, ×50000).

An E solution was applied on a glass plate to form a film-like material using a bar coater (film thickness: 0.35 mm) manufactured by Tester Sangyo Co., Ltd., and then the glass plate was immersed in deionized water containing 30% NMP. Several minutes after immersing, the film-like material was separated from the glass plate. This film-like material was immersed for about 12 hours while flowing deionized water. The film-like material was taken from deionized water and, after wiping up liberated water, the film-like material was sandwiched between filter papers and then inserted into a frame (outer diameter: 125 mm, inner diameter: 100 mm) made of Teflon which was fixed using a clip. The whole was put in a heating oven and dried at 120° C. for one hour. The resultant film had a thickness of 9.4 $\mu$m and a percentage of vacant spaces of 46.4%. The film was observed by a scanning electron microscope. As a result, it has been found that the resultant film was a porous film as shown in FIG. 1 and FIG. 2. The film consisted of PPTA fibrils of 0.02 to 0.05 $\mu$m diameter and had many vacant spaces at the glass plate side (FIG. 1). The opposite side, i.e. coagulating solution side (FIG. 2) showed the form having vacant spaces of 0.01 to 0.03 $\mu$m.

Example 14

Figure 3:
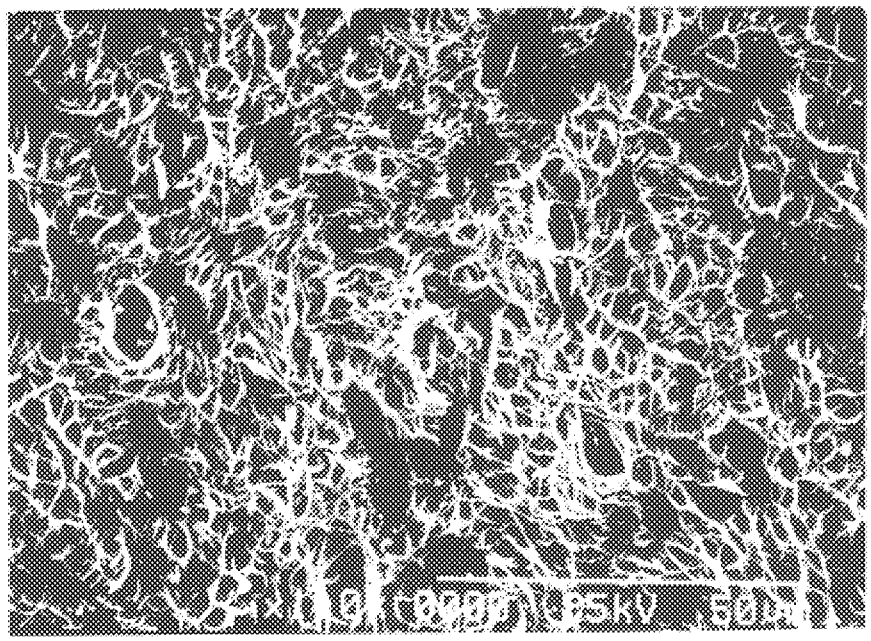
FIG. 3 is a photograph illustrating a structure of the surface of the glass plate side of the porous film obtained in Example 14 (scanning electron micrograph, ×1000).
Figure 4:
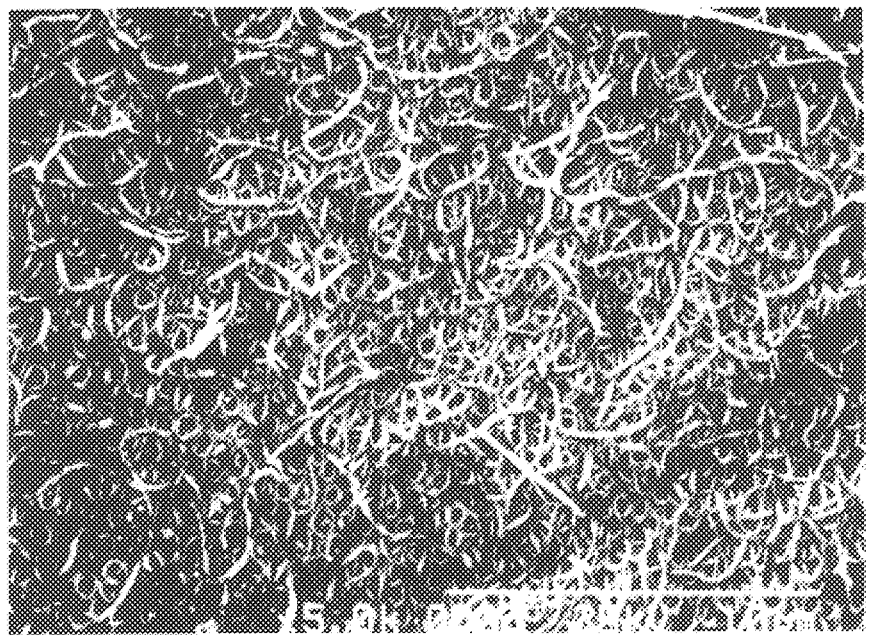
FIG. 4 is a photograph illustrating a structure of the surface of the coagulating solution side of the porous film obtained in Example 14 (scanning electron micrograph, ×5000).

The polymer solution of Example 8 was used as it is, as a PPTA solution for preparing a film. A PPTA solution was applied on a glass plate to form a film-like material using a bar coater (film thickness: 0.60 mm) manufactured by Tester Sangyo Co., Ltd., and then the glass plate was immersed in an acetone solution containing 1% NMP. Several tens minutes after immersing, the film-like material was separated from the glass plate. This deposited film-like material was taken from the acetone solution and immersed in deionized water for 15 hours. Then, the film-like material was taken from deionized water and, after wiping up liberated water, the film-like material was sandwiched between filter papers and then sandwiched between glass cloths. The film-like material was placed on an aluminum plate in a state of being sandwiched between filter papers and glass cloths, and coated with a nylon film. Then, the nylon film and aluminum plate were sealed with a gum and a vacuum conduit was attached thereto. The whole was put in a heating oven and the film-like material was dried at 120° C. while evacuating. The resultant film had a thickness of 264 $\mu$m and a percentage of vacant spaces of 86.8%. The results obtained after observing by a scanning electron microscope are shown in FIG. 3 and FIG. 4. The resultant porous film consisted of PPTA fibrils and had many vacant spaces of about 1 to 10 $\mu$m at the glass plate side (FIG. 3). The opposite side, i.e. coagulating solution side (FIG. 3) was a porous film of a fibril having a diameter of about 0.5 $\mu$m.

Example 15

According to the same manner as that described in Example 1, a NMP solution of PPTA having an inherent viscosity of 1.74 dl/g wherein a PPTA concentration is 2.0% by weight and a molar ratio of calcium to PPD is 2.0:2.0 (mol/mol) was applied on a glass plate to form a film-like material using a bar coater (film thickness: 0.80 mm) manufactured by Tester Sangyo Co., Ltd. Immediately after applying, the film-like material was immersed in an aqueous 30% NMP solution. During immersing, PPTA deposited and the film-like material became cloudy.

This film-like material was immersed in deionized water. Several minutes after immersing, the film-like material was separated from the glass plate. This film-like material was immersed for about one hour while flowing deionized water, and then placed on a circular filter paper having a diameter of 11 cm. The film-like material was transferred to a dry filter paper and fixed to a circular frame while sandwiching between filter papers, followed by drying at 120° C. for 2 hours.

Figure 5:
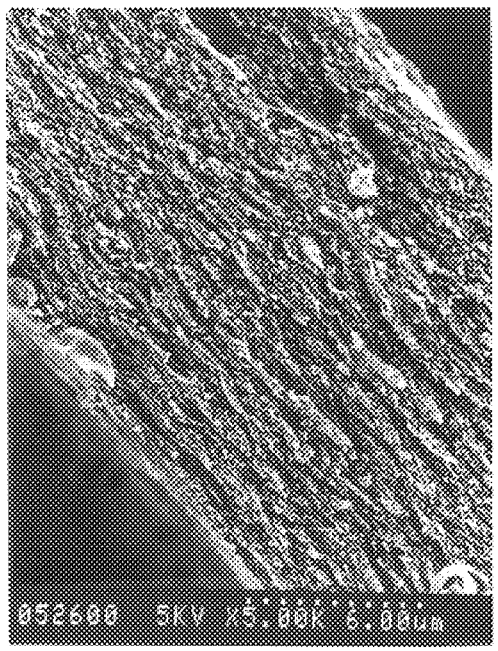
FIG. 5 is a photograph substituted for a drawing, illustrating a structure of the section of the porous film obtained in Example 15 (scanning electron micrograph, ×5000).

The film obtained after drying had a thickness of 42 μm and a percentage of vacant spaces of 56%. This film was immersed in water, solidified with freezing and then folded. The folded film was dried and the section was observed by a scanning electron microscope. As a result, the resultant film was a porous film having a laminar structure wherein laminar materials of fibrils of PPTA are laminated each other, as shown in FIG. 5.

Comparative Example 1
(Test pursuant to Example 10 of Japanese Patent Kokoku No. 59-36936)

Using a 500 ml separable flask equipped with a stirring blade, a thermometer, a nitrogen introducing tube and a powder adding inlet, PPTA was polymerized. After 12.96 g of calcium chloride and 6.28 g (0.005807 mol) of PPD were dissolved in 400 ml of NMP, the resultant solution was cooled to 0° C. Then, 12.21 g (0.06014 mol) of powdered TPC was added in a single portion and the mixture was polymerized. After aging for 30 minutes, 8.5% by weight of water was added to a PPTA solution and, as a result, white PPTA deposited on the liquid surface. After completion of adding water, the PPTA solution was solidified. Aliquot of this PPTA solution was taken and reprecipitated in water and, after washing and drying, the inherent viscosity was measured. As a result, it was 1.55 dl/g.

Comparative Example 2
(Test pursuant to Example 10 of Japanese Patent Kokoku No. 59-36936, A molar ratio of PPD to TPC was allowed to approach 1) Using a 500 ml separable flask equipped with a stirring blade, a thermometer, a nitrogen introducing tube and a powder adding inlet, PPTA was polymerized. After 13.80 g of calcium chloride and 6.73 g (0.006223 mol) of PPD were dissolved in 400 ml of NMP, the resultant solution was cooled to 0° C. Then, 12.88 g (0.06344 mol) of powdered TPC was added in a single portion and the mixture was polymerized. After aging for 60 minutes, the PPTA solution was solidified to form a jelly-like material. Aliquot of the solidified polymerized material was taken and reprecipitated in water and, after washing and drying, the inherent viscosity was measured. As a result, it was 2.33 dl/g. It was unable to synthesize PPTA solution in which an inherent viscosity of PPTA was 3.81 dl/g, such as it was described in Japanese Patent Kokoku No. 59-36939, example 10.

Comparative Example 3
(Test pursuant to Example 3 of Japanese Patent Kokoku No. 59-14494)

Figure 6:
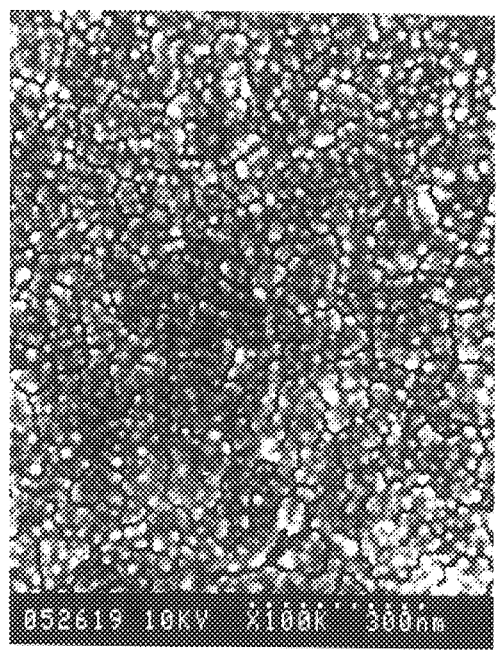
FIG. 6 is a photograph illustrating a structure of the surface of the coagulating solution side of the porous film obtained in Comparative Example 3 (scanning electron micrograph, ×100000).

Using a 500 ml separable flask equipped with a stirring blade, a thermometer, a nitrogen introducing tube and a powder adding inlet, PPTA was polymerized. After 12.96 g of calcium chloride and 6.28 g (0.005807 mol) of PPD were dissolved in 400 ml of NMP, the resultant solution was cooled to 0° C. Then, 12.21 g (0.06014 mol) of powdered TPC was added in a single portion and the mixture was polymerized. After aging for 30 minutes, a PPTA solution was applied on a-glass plate using a bar coater (film thickness 0.60 mm) manufactured by Tester Sangyo Co., Ltd. Immediately after applying, the glass plate was maintained under a nitrogen atmosphere at −30° C. for 10 minutes and immersed in a dry ice-acetone solution at −70° C. for 4 hours. The resultant film was yellow and transparent. The percentage of vacant spaces of this film was 26.4%. A scanning electron micrograph of the resultant film is shown in FIG. 6. It indicates that there are gold particle plated with vapour deposition method on the film surface, and no fibril is observed on the smooth surface.

Comparative Example 4
(Test pursuant to Example 1 of Japanese Patent Kokoku No. 59-36939)

Figure 7:
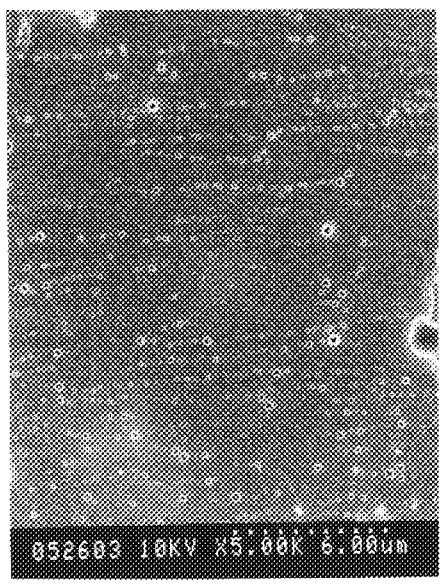
FIG. 7 is a photograph illustrating a structure of the surface of the coagulating solution side of the porous film obtained in Comparative Example 4 (scanning electron micrograph, ×10000).

To 18 g of N,N'-dimethylacetamide solution in which 0.67 g of lithium chloride is dissolved, 4 g of poly(metaphenylene isophthalamide) having an inherent viscosity of 1.35 dl/g was added and dissolved. Next, 2.17 g of water was added to this solution and stirred to obtain transparent and viscous solution. Then, the viscous solution was applied on a glass plate to form a film-like material using a bar coater (film thickness: 0.60 mm) manufactured by Tester Sangyo Co., Ltd. After maintaining in the heating oven at 140° C. for 20 minutes, the film-like material was immersed in water, washed with water and dried to obtain a film. The film obtained was transparent and the percentage of vacant spaces is 15.0 %. Scanning electron micrograph of the film is shown in FIG. 7. Vacant spaces were observed partially but no fibrils were observed.

Comparative Example 5

Figure 8:
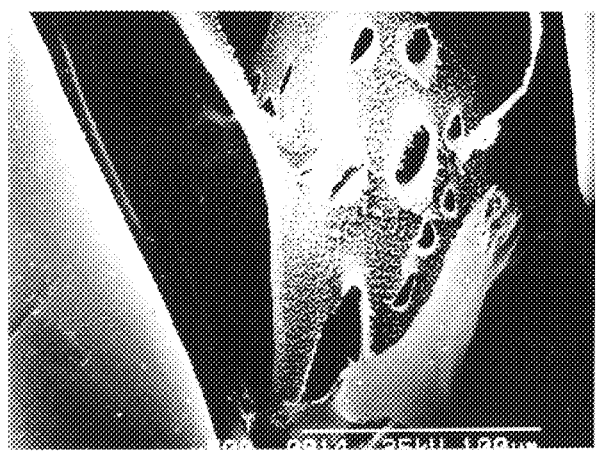
FIG. 8 is a photograph illustrating a structure of the surface of the glass plate side of the porous film obtained in Comparative Example 5 (scanning electron micrograph, ×500).

8.4 g of poly(metaphenylene isophthalamide) having an inherent viscosity of 1.35 dl/g was added to N-methyl-2-pyrrolidone at 90° C. and dissolved with stirring. The solution was cooled to 10° C. After cooling, the solution was transparent.

a) The solution above was applied on a glass plate to form a film-like material using a bar coater (film thickness: 0.60 mm) manufactured by Tester Sangyo Co., Ltd. After maintaining in the heating oven at 140° C. for 20 minutes, the film-like material was immersed in water, washed with water and dried to obtain a film. The film obtained was transparent and the percentage of vacant spaces is 11.2 %. In this case, the true specific gravity of the poly(metaphenylene isophthalamide) was assumed to be 1.38 g/cm$^3$.

b) The solution above was applied on a glass plate using a bar coater (film thickness: 0.60 mm) manufactured by Tester Sangyo Co., Ltd. The film obtained was cloudy and the surface was uneven. Scanning electron micrograph of the film is shown in FIG. 8. Vacant spaces were observed partially but no fibrils were observed.

c) The solution above was applied on a glass plate using a bar coater (film thickness: 0.60 mm) manufactured by Tester Sangyo Co., Ltd. The film-like material was immersed in aqueous calcium chloride solution (35% by weight concentration), washed with water and dried to obtain a film. The film obtained was cloudy and the surface was uneven. Scanning electron micrograph of the film clearly indicated that there were no fibrils.

Comparative Example 6
(Test pursuant to Example 7 of Japanese Patent Kokoku No. 59-36939)

To 20 g of NMP, 4 g of poly(metaphenylene isophthalamide) having an inherent viscosity of 1.35 dl/g was added and dissolved. After cooling to 10° C., the solution obtained lost the transparency and the viscosity of it increased.

a) The above solution was applied on a glass plate to form a film-like material using a bar coater (film thickness: 0.60 mm) manufactured by Tester Sangyo Co., Ltd. After maintaining in the heating oven at 140° C. for 20 minutes, the film-like material was washed with water and dried to obtain a film. The film obtained was semi-transparent. No fibrils were observed in the scanning electron micrograph of the film.

b) The above solution was applied on a glass plate to form a material using a bar coater (film thickness: 0.60 mm) manufactured by Tester Sangyo Co., Ltd. The film-like material was immersed in 35% by weight concentration of aqueous calcium chloride, and then washed with water and dried to obtain a film. The film obtained was cloudy and the surface was uneven. No fibrils were observed in the scanning electron micrograph of the film.

The porous film of the para-oriented aromatic polyamide produced by the process of the present invention is superior in heat resistance, rigidity and strength and has a structure that fibrils having a diameter of not more than about 1 $\mu$m are planary arranged in the form of a network or a nonwoven fabric and laminated in the form of a layer, which can not be accomplished by a conventional nonwoven fabric. It has also have a property that a thermal linear expansion coefficient at 200° to 300° C. of the film is within $\pm 50 \times 10^{-6}$°C. and a percentage of vacant spaces of the film is from 30 to 95%, which is not recognized in a conventional aramid film. Particularly, the film obtained by the coagulating solution immersing process has a structure that a size of a fibril varies in the thickness direction of the film. The size of the vacant space formed in the film is also comparatively small on one surface of the porous film whereas the size of the vacant space is comparatively large on the opposite surface, which can not be accomplished by a conventional nonwoven fabric. The porous film of the present invention is suitable for a battery separator, by making use of these properties.

What is claimed is:

1. A para-oriented aromatic polyamide porous film comprising a porous film of a para-oriented aromatic polyamide comprising a fibril having a diameter of not more than 1 $\mu$m and having a structure that fibrils are planarly arranged as a network or a nonwoven fabric and laminated as a layer, wherein a thermal linear expansion coefficient at 200° to 300° C. of the film is within $\pm 50 \times 10^{-6}$/°C. and having from 30 to 95% of vacant spaces.

2. The para-oriented aromatic polyamide porous film according to claim 1, having formed in the fibril a vacant space that is smaller on one surface of the porous film than on the opposite surface.

3. The para-oriented aromatic polyamide porous film according to claim 2, wherein the vacant space formed in the fibril has a size that varies continuously in the thickness direction of the porous film.

4. The para-oriented aromatic polyamide porous film according to claim 1, wherein the para-oriented aromatic polyamide is poly(paraphenyleneterephthalamide), poly (parabenzamide), poly(4,4'-benzanilideterephthalamide), poly(paraphenylene-4,4'-biphenylenedicarboxylic acid amide), poly(paraphenylene-2,6-naphthalenedicarboxylic acid amide), poly(2-chloro-paraphenyleneterephthalamide) or a copolymer of paraphenylenediamine/2,6-dichloroparaphenylenediamine/ terephthalic acid amide.

5. A process for producing a para-oriented aromatic polyamide porous film comprising the following steps (a) to (c):

(a) forming a film from a solution containing 1 to 10% by weight of a para-oriented aromatic polyamide having an inherent viscosity of 1.0 to 2.8 dl/g and 1 to 10% by weight of a chloride of an alkali metal or an alkali earth metal in a polar amide solvent or a polar urea solvent;

(b) maintaining the film of step (a) at a temperature of not less than 20° C. or not more than −5° C. to deposit the para-oriented aromatic polyamide; and (c) of immersing the film obtained in step (b) in an aqueous solution or an alcoholic solution to elute the solvent and chloride of the alkali metal or alkali earth metal, followed by drying to obtain a para-oriented aromatic polyamide porous film.

6. A process for producing a para-oriented aromatic polyamide porous film, comprising the following steps:

(i) forming a film from a solution containing 1 to 10% by weight of a para-oriented aromatic polyamide having an inherent viscosity of 1.0 to 2.8 dl/g and 1 to 10% by weight of a chloride of an alkali metal or an alkali earth metal in a polar amide solvent or a polar urea solvent;

(ii) immersing the film in a coagulating solution containing 0 to 70% by weight of a polar amide solvent or a polar urea solvent to coagulate and deposit the para-oriented aromatic polyamide; and (iii) immersing the film obtained in step (ii) in an aqueous solution or an alcoholic solution to elute the solvent and chloride of the alkali metal or alkali earth metal, followed by drying to obtain a para-oriented aromatic polyamide porous film.

7. The process for producing the para-oriented aromatic polyamide porous film according to claim 5 or 6, wherein the polar amide solvent or polar urea solvent is N,N-dimethylformamide, N,N-dimethylacetamide, N-methyl-2-pyrrolidone or tetramethylurea.

8. The process for producing the para-oriented aromatic polyamide porous film according to claim 5 or 6, wherein the chloride of the alkali metal or alkali earth metal is lithium chloride or calcium chloride.

9. A para-oriented aromatic polyamide porous film produced by any one process of claims 5, 6, 7 or 8.

10. A battery separator produced by using any one aromatic polyamide porous film of claims 1, 2, 3, 4 or 9.

* * * * *